United States Patent [19]

Spahrbier

[11] Patent Number: 4,628,012
[45] Date of Patent: Dec. 9, 1986

[54] EXPLOSION-PROOF, HERMETICALLY SEALED GALVANIC CELL

[75] Inventor: Dieter Spahrbier, Kelkheim-Fischbach, Fed. Rep. of Germany

[73] Assignee: Varta Batterie Aktiengesellschaft, Hanover, Fed. Rep. of Germany

[21] Appl. No.: 799,945

[22] Filed: Nov. 20, 1985

[30] Foreign Application Priority Data

Nov. 29, 1984 [DE] Fed. Rep. of Germany ....... 3443453

[51] Int. Cl.$^4$ ............................................. H01M 2/12
[52] U.S. Cl. ....................................... 429/53; 429/185
[58] Field of Search ................................... 429/53-56, 429/175, 176, 185

[56] References Cited

U.S. PATENT DOCUMENTS 3,338,750 8/1967 Urry ...................................... 429/53
4,307,158 12/1981 Thibault ................................. 429/56
4,483,908 11/1984 Zimmerman ..................... 429/53 X Primary Examiner—Charles F. LeFevour
Attorney, Agent, or Firm—Weiser & Stapler

[57] ABSTRACT

In a hermetically sealed cell, the housing is formed by two metal cylinders which are each closed at one end and which are pushed over one another to obtain a press-fit such that, with the interposition of an intermediate insulating layer made from a plastic material, the cylinder which forms the lid of the cell can be pushed off from the cylinder which forms the can of the cell only in response to a predetermined internal pressure. High internal pressures which are lower than the bursting pressure for the cell, generated by the excessive release of gases or vapors, are permitted to escape through vent holes, if necessary, which become exposed in increasing number after being uncovered during separation of the lid from the cup.

12 Claims, 3 Drawing Figures

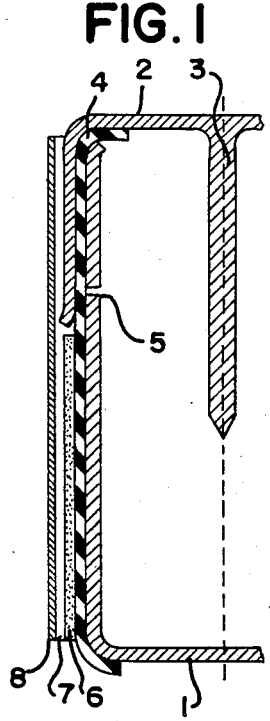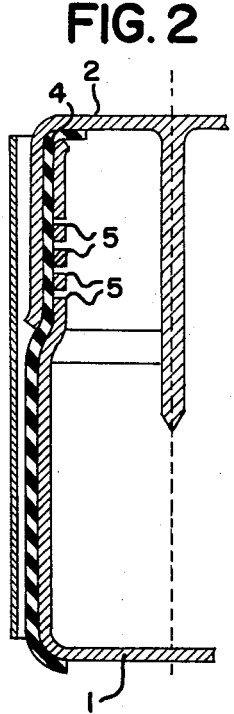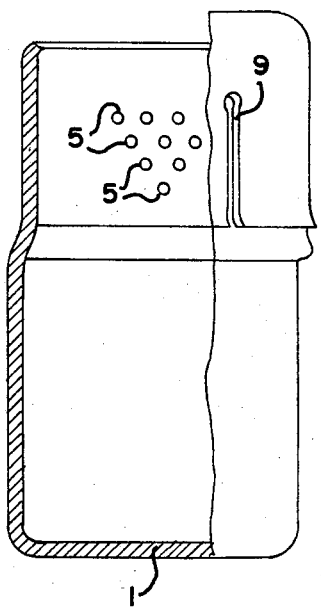

EXPLOSION-PROOF, HERMETICALLY SEALED GALVANIC CELL

BACKGROUND OF THE INVENTION

The present invention relates generally to a galvanic cell with a hermetically sealed cylindrical metal housing which is protected from the risk of explosion. The invention is applicable to primary electrochemical batteries as well as to storage batteries, insofar as they contain liquid electrolytes and are therefore at least sealed in a liquid-tight manner.

In connection with sealed, leak-proof housings, the potential exists for severe damage to the cell if it is used improperly or if it is subjected to extreme conditions, such as excessive charging, overheating, etc. As a consequence of these conditions, an abnormal internal gas or vapor pressure can develop which eventually causes leakage due to bursting of the cell housing.

Many of the known measures which are used in an effort to prevent such explosions are therefore based on pressure-sensitive devices. For example, according to DE-OS No. 3,206,607, a pointed screw is mounted over the lid of a hermetically sealed battery. The screw is capable of puncturing the lid when it is forced outwardly as a consequence of internal pressures developed in the battery, so that the contents of the battery may be squeezed out.

In GB-PS No. 1,336,567, a pressure relief valve for an alkaline cell is disclosed wherein a highly deformed cone made from an elastomer is press fit into a gas canal such that it ordinarily fills the canal, but so that it can be blown from the canal if extremely high pressures are encountered. In such case, the cone assumes another sealing position over the canal opening, but with a low degree of deformation which permits at least the overpressure to be released through a vent opening.

In DE-AS No. 26 20 466, a gas release valve is described wherein a seal comprised of a heat-sealable material fills a gas release opening which is provided in the wall of the cell, while adhering to a trough-shaped, recessed internal surface of the wall. If a sufficiently high internal pressure is reached, the material flows out through the pressure-relief opening in the wall, enabling the overpressure to escape from the interior of the battery.

Lastly, according to other prior art designs (e.g., GB-PS No. 1,445,043), the housing of the cell can be provided with a predetermined breaking point in order to protect the housing from bursting.

While cell explosions are extremely rare under ordinary operating conditions, the above-described cells are still susceptible to explosion when misused. This may include storage batteries which are exposed to fire either deliberately or through negligence, or primary cells which are subjected to charging, which is not permissible.

SUMMARY OF THE INVENTION

It is therefore the principal object of the present invention to provide a means for sealing galvanic cells of the type previously described which serves to reliably prevent bursting of the cell due to excessive internal pressure, while involving only minimal production costs.

This and other objects which will become apparent are accomplished according to the present invention by providing a galvanic cell with a tightly sealed housing comprised of a pair of cylinders which are each closed on one side and which are press fit into one another so that one of the cylinders is overlapped by the other, with the interposition of an electrical insulation material. The cylinders are retained together in such a way that they can be separated from each other only in response to a predetermined high internal pressure, to expose a vent hole provided in the outermost cylinder in the region where the inner and outer cylinders overlap one another.

For further detail regarding a galvanic cell constructed according to the present invention, reference is made to the detailed discussion which follows, taken in conjunction with the following illustrations.

BRIEF DESCRIPTION OF THE DRAWINGS

FIG. 1 shows a partial, longitudinal cross-section of the housing of a galvanic cell according to the present invention.

FIG. 2 shows a partial, longitudinal cross-section of an alternative cell housing according to the present invention.

FIG. 3 shows a partially sectioned, elevational view of the cell housing shown in FIG. 2.

In the several views provided, like reference numerals denote similar structure.

DETAILED DESCRIPTION OF PREFERRED EMBODIMENTS

In the cell housing shown in FIG. 1, a first metal cylinder 1 is provided which is closed at one end and which serves as the cell cup, and a second metal cylinder 2 is provided which is also closed at one end and which acts as the lid of the cell. The lid of the cell is further provided with a spot-soldered negative take-off conductor 3. The internal structure of the cell, including the concentric arrangement of the anode material, is otherwise conventional and therefore is not shown for the sake of clarity. To complete the cell, the cylinders 1, 2 are pushed together so as to develop a press fit engagement, with the interposition of an electrical insulating layer 4 made from a plastic material, such that the lid 2 can be pushed off from the cup 1 only in response to strongly increasing internal pressure.

One or more vent holes 5, having a diameter on the order of 0.1 mm, are provided (e.g. drilled by laser) in the wall of the cup 1 where the cup 1 is overlapped by the lid 2. The diameter of the hole 5 should preferably be smaller than the thickness of the covering plastic insulation layer 4, and at least one vent hole 5 should be located near the lower end of the overlap between the cup 1 and the lid 2. With reference to FIG. 2, further vent holes 5 may be located at spaced distances from the lower end of the overlap, if desired. The distribution according to the pattern shown in FIG. 3 is especially advantageous, since the frequency of the holes increases with increasing distance from the lower end of the overlap.

FIG. 1 also shows a cup lamination 6. Cup lamination 6 preferably has a thickness of about 0.3 mm, and serves to compensate for projection of the lid 2 beyond the surface of the cup 1. In finishing the cell, a plastic film 7 is provided which envelopes the entire housing, and a metal film 8 is provided which serves as a carrier for labeling or the like. The thickness of the plastic film 7 is preferably about 0.1 mm. The metal film is preferably an aluminum film having a thickness of about 0.05 mm. It is also possible to use a plastic-laminated metal film, or in the simplest case, even a metal film alone, as an alternative to the separate films 7, 8. However, use of the plastic film 7 is preferred to increase the length of the leakage path across the sealed section (overlapping region), and to reduce permeation.

The usual sealing materials such as polypropylene, polyethylene and polypropylene copolymers, polyamide, nylon, as well as rubber or fluorinated hydrocarbon polymers, including polytetrafluorethylene, can be used as the electrical insulation material 4. To develop the insulation layer 4, the outside of the cup 1 or the inside of the lid 2 may be provided with the desired plastic coating.

However, the use of a shrinkable plastic tubing as the insulation layer 4 also presents itself as an advantageous alternative to a coating, particularly in connection with an embodiment such as is shown in FIG. 2, wherein the diameter of the overlapped portion of the cup 1 is slightly reduced (e.g., by rolling with a ball collar in order to obtain a jacket surface flush with the lid). However, in such case, the cathode material should first be placed in the cup 1. To be noted is that in fully enveloping the cup 1 with the shrinkable plastic tubing, the cup 1 is protected from metallic contact with other cells, which could otherwise cause short-circuits.

Yet another means for isolating the cup 1 and lid 2 according to the present invention is to provide an open plastic cap, in the form of a molded part, which sits on the open end of the cup 1 and wnich extends over its open edge so as to at least cover the overlapping region which is subsequently developed between the cup 1 and the lid 2.

In the event that unacceptably high internal pressures are built up in the finished cell, the foregoing structural elements combine to enable the lid 2 to be pushed off from the cup 1. Such expansion initially takes place slowly due to the initial pressures which are encountered, and due to the static friction between the plastic separator 4 and the metal lid 2. As the lid 2 slides off of the cup 1, vent holes 5 are progressively exposed, permitting excess gas, and possibly even a small quantity of electrolyte, to seep from under the insulation layer 4 and then from under the metal-laminated plastic film 7, 8, exiting at the ends. If the pressure build-up continues notwithstanding such measures, the lid 2 is pushed off still further, exposing new holes 5 until the pressure is equalized. The pressure is thus equalized "as needed", the vent holes 5 serving to counteract increased acceleration of the pushing off of the lid 2. As such, the vent holes 5 form a quasi bypass for permeation. To be noted is that ultimately, before an explosion could occur in the extreme case, the overpressures will be released at a controlled rate due to the "pushing off" of the lid 2. As a result, explosive destruction of the housing is avoided.

In assembling the cell, the only parameter which needs to be known is the critical behavior of the underlying electrochemical system under the assumed maximum load (electrolyte vapor pressure as a function of temperature; gas pressure in the case of an anticipated increase in the usual charge rate by several times) which would not yet cause any explosion in the event that the active substances were enclosed in a non-expandable cell housing configured according to the present invention, and which would enable satisfactory functioning. Such limit values are easily determined experimentally. The cylindrical cans according to the present invention are then assembled under appropriate compression to assume the degree of overlapping which is called for in a particular application. The degree of overlapping must also account for the static friction between the sealing plastic layer 4 and the metal lid 2 of the can. These reference values (the coefficients of adhesion, $\mu_o$) are readily found in tables.

In the case of uniformly sized cylindrical cans, the selected degree of overlap is proportional to the pressure which causes separation of the cylinders. Thus, when a greater cell diameter is selected, the overlapped region must be extended in order to have the same closure force, to oppose the constant specific internal pressure. As a general rule, the mutual overlap of the cylinders (measured as the length of the overlapping region) is proportional to the housing diameter, in a ratio of between 1:1 and 1:5 according to the present invention.

The pressure and the point at which the container is to open, even though the extremely high overpressures which would lead to uncontrolled bursting of the container have not yet been encountered, are determined by the closing system used. However, in any event, the telescoping of the cylinders of the housing does not necessarily have to lead to the complete separation of the two cylindrical cans, because substantially complete pressure release will occur when the small dead-space originally present in the container is only slightly increased. At that time, separation of the cylinders comes to a stop.

As a result of the foregoing, complete separation of the housing may be avoided by providing the jacket of the second cylinder with one or several openings 9 according to the present invention. These openings 9 may be of any shape; the simplest case being a slit-shaped opening which preferably extends parallel to the axis of the cylinder. Such structure causes a change in the elastic properties of the lid 2 and enables it to undergo a slight and temporary circumferential expansion under the influence of an overpressure in the cell, so that the surface pressure of the plastic seal 7, 8 also yields somewhat and permits the pressure to escape. Consequently, this embodiment of the sealing system according to the present invention acts as a one-way release valve.

The opening mechanism of the cell according to the present invention also begins to function in the case of an excessive rise in temperature, especially when the material forming the sealing layer 4 has been selected according to its thermal characteristics in such a way that it softens at a predetermined temperature (e.g., at the boiling point of the liquid electrolyte used). In such case, the cylinders are pushed off from each other, even under a low internal pressure, because of the loss of static friction between the lid 2 and the seal 4; even though the same cell would withstand a substantially higher gas pressure (e.g., up to 30 bar) at room temperature. The same cell is consequently able to respond to and open at mutually independent maxima of the internal pressure and temperature.

It will be understood that various changes in the details, materials and arrangement of parts which have been herein described and illustrated in order to explain the nature of this invention may be made by those skilled in the art within the principle and scope of the invention as expressed in the following claims.

During cell assembly, however, vent-holes 5 may turn out to be disadvantageous, since the electrolyte may penetrate through the openings 5, if the attempted electrolyte-level should be above the first vent-hole 5. In such cases a paste-like lyophobic material like e.g. Silicon grease may be used to close vent-holes 5 before metering the electrolyte. This kind of material does not impede in any way the function of the vent-system as given by vent-holes 5.

What is claimed is:

1. A galvanic cell with a tightly sealed metal housing which is protected from the risk of explosion and which comprises:

a first cylinder which is closed at one end; and a second cylinder which is closed at one end;

wherein the cylinders are adapted for press-fit engagement with one another with the first cylinder being overlapped by the second cylinder;

an electrical insulation material disposed between the first and second cylinders in such a way that the cylinders can be pushed off from each other only in response to a predetermined internal pressure; and at least one vent hole in the wall of the first cylinder in the region wherein the second cylinder overlaps the first cylinder.

2. The galvanic cell of claim 1 wherein the vent hole is located near the lower end of the overlapped region.

3. The galvanic cell of claim 2 wherein additional vent holes are provided in the wall of the first cylinder at spaced distances from the lower end of the overlapped region.

4. The galvanic cell of claim 3 wherein the vent holes are distributed so that their frequency increases with increasing distance from the lower end of the overlapped region.

5. The galvanic cell of claim 1 wherein the intermediate insulating layer is a shrinkable plastic tubing enveloping the first cylinder.

6. The galvanic cell of claim 1 wherein the intermediate insulating layer is a plastic coating provided on the outside of the first cylinder or on the inside of the second cylinder.

7. The galvanic cell of claim 1 wherein the intermediate insulating layer is an open plastic cap positioned over the open end of the first cylinder and enveloping the outside of the first cylinder at least in the overlapped region.

8. The galvanic cell of claim 1 wherein the ratio of the length of the overlapped region to the diameter of the housing is between 1:1 and 1:5.

9. The galvanic cell of claim 1 wherein the electrical insulation is formed of a material which softens at a predetermined temperature so that the cylinders are capable of separating at a pressure lower than said predetermined internal pressure in the presence of said predetermined temperature.

10. The galvanic cell of claim 1 wherein the cylindrical housing is enveloped by a plastic-laminated metal film.

11. The galvanic cell of claim 1 wherein the outer cylinder has at least one opening provided therein.

12. The galvanic cell of claim 11 wherein the opening is a longitudinal slit in general alignment with the axis of the cell.

* * * * *